United States Patent [19]
Webber

[11] Patent Number: 4,533,249
[45] Date of Patent: Aug. 6, 1985

[54] PASSIVE RING RESONATOR ANGULAR RATE SENSOR

[75] Inventor: George E. Webber, Buffalo, Minn.

[73] Assignee: Honeywell Inc., Minneapolis, Minn.

[21] Appl. No.: 431,502

[22] Filed: Sep. 30, 1982

[51] Int. Cl.³ .......................... G01B 9/02; G01C 19/64
[52] U.S. Cl. ........................................................ 356/350
[58] Field of Search .............................. 356/350, 349

[56] References Cited
U.S. PATENT DOCUMENTS

| | | | |
|---|---|---|---|
| 4,135,822 | 1/1979 | Ezekiel | 356/350 |
| 4,258,336 | 3/1981 | Fletcher et al. | 356/350 |
| 4,273,445 | 6/1981 | Thompson et al. | 356/350 |
| 4,326,803 | 4/1982 | Lawrence | 356/350 |
| 4,417,815 | 11/1983 | Murray et al. | 356/349 |
| 4,431,308 | 2/1984 | Mitsuhashi et al. | 356/350 |

Primary Examiner—Vincent P. McGraw
Attorney, Agent, or Firm—Robert A. Pajak

[57] ABSTRACT

A passive ring resonator angular rate sensor employing a broad band electromagnetic wave source coupled to a passive ring resonator waveguide structure for generating counter-propagating waves therein.

11 Claims, 3 Drawing Figures

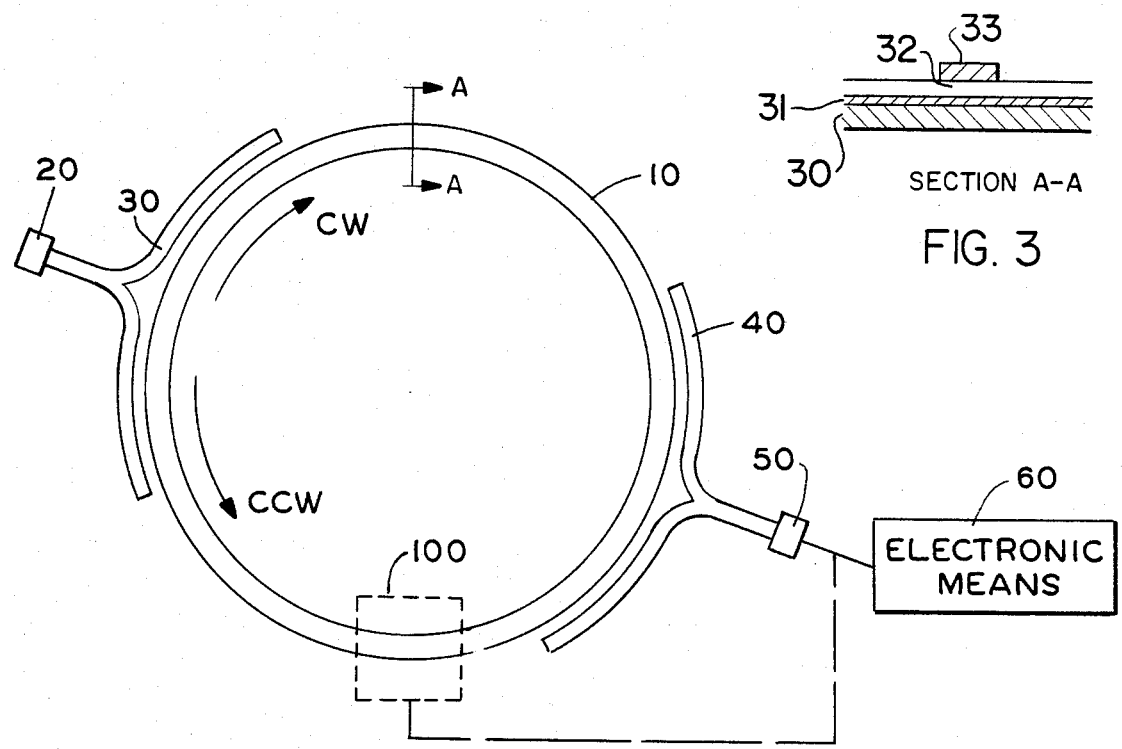
FIG. 3
FIG. 1
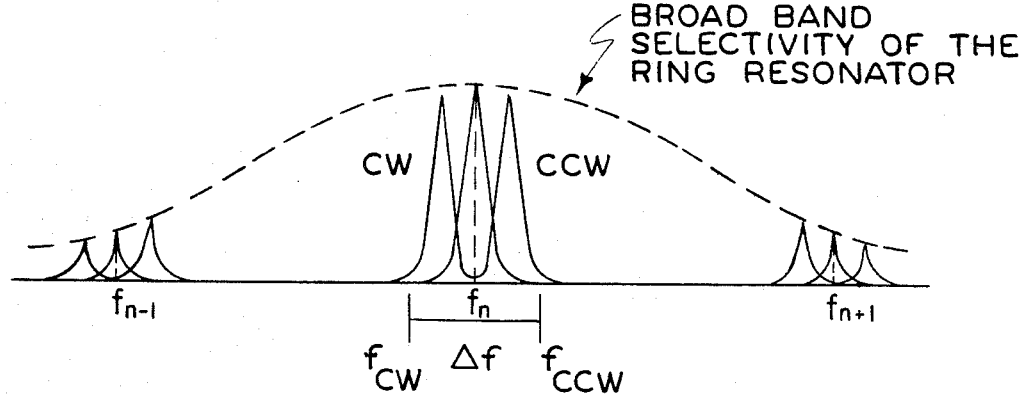
FIG. 2

PASSIVE RING RESONATOR ANGULAR RATE SENSOR

BACKGROUND OF THE INVENTION

The invention of the present application is related to ring laser angular rate sensors employing a passive ring resonator.

The Sagnac effect is well known in the art of ring laser angular rate sensors. In such sensors, a linear relationship is established between the rate of rotation of a closed-loop waveguide structure and the difference in frequency of oppositely directed electromagnetic waves traveling therein. In the art, there exists two types of waveguide structures: (i) active ring resonators and (ii) passive ring resonators.

Active ring resonator systems are well known in the art and are described in U.S. Pat. No. 3,373,650 by Killpatrick. An active ring resonator is one in which the resonator itself is part of an electromagnetic wave oscillator for generating two oppositely traveling electromagnetic waves within the resonator. In U.S. Pat. No. 3,373,650, a laser gain medium is located within an optical closed-loop path for generating counter-propagating laser beams, the optical closed-loop path defining a resonant cavity waveguide structure. In active ring resonator systems, the rate of rotation of the closed-loop path determines the frequency of the counter-propagating waves since the effective closed-loop path length determines the frequency of the wave produced by the integral oscillator.

Passive ring resonator systems are also well known. U.S. Pat. No. 4,135,822 by Ezekiel, and U.S. Pat. No. 4,326,803 by Lawrence describe a passive ring resonator system. An electromagnetic wave source external to the resonator is coupled to a ring resonator structure to produce counter-propagating waves within the structure. In passive ring resonator systems, the frequency of the beams is solely dependent on the electromagnetic wave source. The rate of rotation of the closed-loop path dictates which frequencies are allowed to propagate within the resonant structure.

In each of the foregoing passive ring resonator patents, a laser beam is coupled to a passive ring resonator. The frequency of the laser beam is adjusted to determine the resonant frequency of the optical closed-loop path for each propagation direction. The difference between the resonant frequencies of each direction of propagation is indicative of the rotation rate of the closed-loop path or passive ring resonator.

SUMMARY OF THE INVENTION

A broad band electromagnetic wave source is coupled to a passive ring resonator for generating counter-propagating waves therein. A detector for distinguishing the resonant frequencies of the resonator is coupled to the resonator, the resonant frequency difference between the counter-propagating waves being indicative of the rotation of the passive ring resonator.

DESCRIPTION OF THE DRAWINGS

FIG. 1 shows a passive ring resonator angular rate sensor in accordance with the present invention.

FIG. 2 is a gain frequency characteristic of a resonant waveguide structure.

FIG. 3 shows a cross-section of a ring resonator.

DETAILED DESCRIPTION OF THE INVENTION

Shown in FIG. 1 is a passive ring resonator angular rate sensor of the present invention. In FIG. 1, a passive ring resonator 10 is shown as a closed-loop optical thin-film waveguide. A broad band energy source 20 such as a laser diode is shown coupled to resonator 10 through coupling means 30. Coupling means 30 is suggested as a thin-film optical waveguide directional coupler which uses parallel coupled waveguide coupling techniques. A laser diode such as a Mitsubishi ML-4001 may be "butt-coupled" to coupling means 30, e.g. utilizing a short optical fiber therebetween, for providing optical input to the thin-film waveguide. A second coupling means 40, similar to coupling means 30, couples resonator 10 to non-linear mixing means 50 used as a detector which may also be butt coupled thereto. Non-linear mixing means 50 may be provided by a photodetector diode such as a Texas Instruments TIL401. The output of non-linear mixing element 50 is coupled to electronic means 60 which is responsive to the output of non-linear mixing element 50 for filtering frequency components of the output of mixing element 50.

In the preferred embodiment, resonator 10 is constructed using a high-Q, closed-loop ring resonator which is excited using optical energy from source 20. The resonator may be fabricated from any closed-loop transmission line structure or plane wave propagation path appropriate to achieve high-Q at the wave length of operation. The closed-loop resonator 10 could also include gain to enhance its Q. The resonator may be provided by the thin-film waveguide shown in FIG. 1, by a fiber optical waveguide, and the like.

As is well known, the inertially stationary resonator structure 10 has a plurality, "n," of resonant frequencies related to the effective length, L, of the resonator 10 by the expression:

$$n\lambda = 2L$$

When the resonator is held perfectly stationary, the resonator has clockwise and counterclockwise identical resonant frequencies corresponding to the natural stationary resonances of the resonator discussed above. However, under the influence of rotation in the plane of the resonator, the clockwise and counterclockwise resonant frequencies split via the Sagnac Effect wherein the frequency of one of the waves in one direction will increase while the resonant frequency of the opposite direction wave decreases.

Passive ring resonator 10 is structured so as to enhance the existence of selected resonant frequencies while suppressing others. This is substantially shown in FIG. 2 which shows a gain characteristic versus resonant frequency characteristic of a desired passive ring resonator and may be provided by a single mode optical fiber or thin-film optical waveguide. The propagation characteristic of the selected resonant waveguide shown in FIG. 2 exhibits maximum gain at resonant frequency $f_n$, and suppressed gain on either side of frequency $f_n$, namely $f_{n+1}$ and $f_{n-1}$. Also shown is the established resonant clockwise and counterclockwise frequencies of $f_n$, and the frequency difference $\Delta f$ due to rotation.

Energy source 20 is one which provides relatively coherent energy wave or beam such as a laser diode or other source appropriate for the frequency of operation of the sensor. The energy source is constructed such that the spectral width of its emitted energy is sufficiently broader than the maximum expected resonance separation frequency $\Delta f$ of the resonator occurring at maximum expected rotation rates. The spectral width of the source should be greater than the maximum expected separation frequency to insure that the source is capable of exciting both the desired clockwise and counterclockwise resonant wave frequencies of the ring resonator under all anticipated conditions. A practical source of energy for source 10 is a laser diode which provides the intended broad band energy source. In order to prevent the unwanted excitation of other harmonic modes of the resonator the spectral extent of energy from source 10 can be truncated to prevent excitation of these modes, and if appropriate, waveguide transverse model characteristics of the resonator or other optical components may be used to prevent excitation of unwanted resonant modes.

Coupling means 30 may be an ordinary directional coupler coupling source 20 to the thin-film waveguide ring resonator structure 10 in a well known manner such as that already described. Energy from source 20 is coupled to ring resonator 10 in both directions of propagation around the resonator and results in the excitation of resonance under all conditions of rotation. Energy injected into resonator 10 by the broad band source 20 at frequencies other than resonant frequencies tend to be suppressed as aforesaid.

In the present invention, the resonant frequencies of the counter-propagating waves is detected by utilization of a non-linear mixing element 50 responsive to a portion of each of the resonator's counter-propagating waves through use of coupling means 40. The specific selection of non-linear mixing element 50 depends upon the selected wavelength of operation but at optical wavelengths non-linear mixing element 50 may be provided by a photodetector diode or a laser diode amplifier. In operation, non-linear mixing element 50 effectively mixes the energy of each of the counter-propagating waves in order to generate the fundamental difference frequency component being the difference in frequency between the frequencies of the counter-propagating waves, as well as the fundamental sum frequency component being the frequency sum of the frequency of the counter-propagating waves. The output of the non-linear mixing element 50 is shown coupled to electronics means 50 so as to filter out the difference frequency component therefrom by conventional frequency selection circuitry. This is easily accomplished by a good filter for eliminating the "sum frequency" and providing optimum gain near the zero-rotation-rate difference frequency (e.g. 0 to 10 KHZ). The difference frequency component is the intended output which is directly related to the rate of rotation of the resonator.

An alternate arrangement of a passive ring resonator employing the principles of the invention is also illustrated in FIG. 1. Coupling means 40 and non-linear mixing means 50 may be replaced by an alternate non-linear mixing means 100 directly in the path of the waves traveling about the closed-loop path. In FIG. 1, a laser diode amplifier may be utilized as non-linear mixing means 100. FIG. 1 illustrates a segment of the ring resonator 10 removed and replaced by non-linear mixing means 100 inserted therein. Means 100 is coupled to electronics means 60 similar to the output of means 50, and provides the same intended function. The operation of the alternate arrangement is similar to that already described, but has the advantage of minimizing optical components and may reduce problems associated with optical circuit mismatches and extraneous reflections.

The embodiment shown in FIG. 1 may be implemented using integrated circuit techniques which are especially suitable for implementation at optical wavelengths using laser diode sources for source 20 as well as thin and thick film waveguides and the like, for providing the passive ring resonator path 10. Waveguides known in the art are illustrated in U.S. Pat. No. 3,949,320 by Castleberry et al., and U.S. Pat. No. 4,273,445 by Thompson et al.

FIG. 3 illustrates a cross-section A—A of one embodiment of the waveguide shown in FIG. 1. A silicon substrate 30 supports a zinc oxide optical waveguide 32 deposited on the substrate having a silicon dioxide layer 31. Transverse-Mode confinement may be provided by PMMA photoresist 33 cladding adjacent to the ring waveguide.

The embodiment shown in FIG. 1 is advantageous over the prior art since there is no servo mechanism for adjusting the frequencies of the propagating paths to determine peak intensity and thus obviates the need for additional electronic circuitry which would introduce errors into the system. The system shown in FIG. 1 utilizes a simple electronic filtering technique for determining the frequency difference by use of a non-linear mixing means responsive to the counter-propagating waves traveling in the ring resonator.

It is, therefore, to be understood that within the scope of the depending claims the invention may be practiced otherwise as specifically described.

The embodiments of the invention in which an exclusive property or right is claimed are defined as follows:

1. A passive ring resonator angular rate sensor comprising:
   a passive ring resonator waveguide structure for providing a closed-loop path capable of propagating first and second counter-propagating waves of energy about said closed-loop path, wherein the rate of rotation of said closed-loop path establishes an effective closed-loop path length defining at least one resonant frequency of said first wave and at least one resonant frequency of said second wave;
   source means capable of producing broad band electromagnetic energy wave;
   coupling means for concurrently introducing at least a portion of said broad band electromagnetic energy in opposite directions about said closed-loop path thereby providing coexisting first and second counter-propagating waves, each at its respective resonant frequency; and
   combining means responsive to at least a portion of said first and second waves for combining said waves so as to produce an output signal having a difference signal component related to the difference between said resonant frequency of said first and second waves indicative of the rotation rate of said closed-loop path.

2. The apparatus of claim 1 wherein said source means is a laser diode.

3. The apparatus of claim 1 wherein said combining means is a non-linear mixing means directly in the path of said waves.

4. The apparatus of claim 3 wherein said combining means is a laser diode amplifier.